United States Patent
Ha et al.

(10) Patent No.: US 11,195,632 B2
(45) Date of Patent: Dec. 7, 2021

(54) COOLING WATER RESERVOIR AND NUCLEAR REACTOR BUILDING PASSIVE COOLING SYSTEM

(71) Applicant: KOREA HYDRO & NUCLEAR POWER CO., LTD, Gyeongsangbuk-do (KR)

(72) Inventors: Hui Un Ha, Daejeon (KR); Sang Won Lee, Daejeon (KR); Han Gon Kim, Daejeon (KR)

(73) Assignee: Korea Hydro & Nuclear Power Co., LTD., Gyeongsangbuk-do (KR)

( * ) Notice: Subject to any disclaimer, the term of this patent is extended or adjusted under 35 U.S.C. 154(b) by 371 days.

(21) Appl. No.: 16/328,968

(22) PCT Filed: Oct. 27, 2016

(86) PCT No.: PCT/KR2016/012133
§ 371 (c)(1),
(2) Date: Feb. 27, 2019

(87) PCT Pub. No.: WO2018/043801
PCT Pub. Date: Mar. 8, 2018

(65) Prior Publication Data
US 2019/0279779 A1    Sep. 12, 2019

(30) Foreign Application Priority Data

Aug. 29, 2016 (KR) .......................... 10-2016-0110315

(51) Int. Cl.
*G21C 15/18* (2006.01)
*B65D 88/74* (2006.01)
*B65D 90/00* (2006.01)

(52) U.S. Cl.
CPC ............. *G21C 15/18* (2013.01); *B65D 88/74* (2013.01); *B65D 90/00* (2013.01); *Y02E 30/30* (2013.01)

(58) Field of Classification Search
CPC ......... G21C 15/18; B65D 88/74; B65D 90/00
(Continued)

(56) References Cited

U.S. PATENT DOCUMENTS 5,011,652 A * 4/1991 Tominaga ............... G21C 15/18
376/299
5,272,737 A * 12/1993 Fujii ....................... G21C 15/18
376/298
(Continued)

FOREIGN PATENT DOCUMENTS

GB    2531190 A * 4/2016 ............. G21C 15/18
JP    09-101393       4/1997
(Continued)

*Primary Examiner* — Jack W Keith
*Assistant Examiner* — Daniel Wasil
(74) *Attorney, Agent, or Firm* — Occhiuti & Rohlicek LLP (57) ABSTRACT

A reservoir tank for use in a nuclear reactor building includes a reservoir tank in which cooling water is stored. A partition part is disposed in the reservoir tank and partitions the inside of the reservoir tank into a first storage tank and a second storage tank so as to separate the cooling water in the reservoir tank. An inflow part is disposed in the partition part and allows the cooling water of the second storage tank to naturally flow into the first storage tank by the difference between the water levels of the first and second storage tanks when the water level of the first storage tank is lowered. This configuration is advantageous in that a nuclear reactor does not need to be pressurized and reheated when the nuclear reactor building is cooled due to a severe accident.

14 Claims, 7 Drawing Sheets

(58) Field of Classification Search
USPC .................................................. 376/298, 299
See application file for complete search history.

(56) References Cited

U.S. PATENT DOCUMENTS

| | | |
|---|---|---|
| 5,694,442 A | 12/1997 | Cinotti et al. |
| 2012/0294408 A1 | 11/2012 | Reyes et al. |
| 2015/0221403 A1 | 8/2015 | Kim et al. |
| 2015/0357060 A1* | 12/2015 | Malloy .................. G21C 13/10 |
| | | 376/293 |

FOREIGN PATENT DOCUMENTS

| | | |
|---|---|---|
| JP | 2012-198168 | 10/2012 |
| KR | 10-2014-0050154 | 4/2014 |
| KR | 10-2014-0112198 | 9/2014 |

* cited by examiner

FIG. 6

COOLING WATER RESERVOIR AND NUCLEAR REACTOR BUILDING PASSIVE COOLING SYSTEM

CROSS-REFERENCE TO RELATED APPLICATIONS

This application is the U.S. National Stage of International Application No. PCT/KR2016/012133, filed on Oct. 27, 2016, which claims the priority filing date of Korean Application No. 10 2016 00110315, filed on Aug. 29, 2016.

TECHNICAL FIELD

The present invention relates to a cooling water reservoir and a nuclear reactor building passive cooling system including the same, and more particularly, to a cooling water reservoir for cooling a nuclear reactor building and a nuclear reactor building passive cooling system including the same.

BACKGROUND ART

In general, in the event of a severe accident at a nuclear power plant, a radioactive material is discharged together with steam into the nuclear reactor building and thus a temperature and pressure in the nuclear reactor building rise sharply. In this case, when the rising temperature and pressure are not adjusted, the nuclear reactor building may be destroyed. Therefore, a nuclear reactor building cooling system is provided in the nuclear reactor building and thus in the event of a severe accident, the rising temperature and pressure may be adjusted.

However, in the event of a severe accident, it is difficult for an operator to access to control the cooling system, and there is a problem that the cooling system does not operate properly due to a problem such as a power loss. Therefore, a passive cooling system is applied. The passive cooling system may include a cooling water reservoir installed outside the nuclear reactor building and a heat exchanger extended from the cooling water reservoir into the nuclear reactor building.

Therefore, in the event of a severe accident, as the heat exchanger operates, the nuclear reactor building is cooled. Here, at the beginning of the accident, thermal energy is smoothly removed by a low temperature of cooling water. However, when a temperature of cooling water rises due to repeated heat exchange, thermal energy may not be completely removed and thus there is a problem that a temperature and pressure of the nuclear reactor building rise again.

DISCLOSURE

Technical Problem

The present invention provides a cooling water reservoir for preventing a nuclear reactor building from being repressed and reheated while cooling the nuclear reactor building in the event of a severe accident and a nuclear reactor passive cooling system including the same.

Technical Solution

A cooling water reservoir that can passively cool a building includes a storage tank that stores cooling water; a partition part disposed inside the storage tank and that partitions the inside of the storage tank into first and second storage tanks so as to separate the cooling water; and an inlet provided in the partition part and that enables cooling water of the second storage tank to naturally enter into the first storage tank according to a water level difference between the first and second storage tanks when a water level of the first storage tank decreases.

In the first storage tank, a heat exchanger extended from the storage tank to the building and that cools the building based on the cooling water of the first storage tank may be installed.

A capacity of the first storage tank may be smaller than that of the second storage tank.

The partition part may include a partition disposed between an upper wall and a lower wall of the storage tank.

The inlet may include at least one pipe disposed in the partition or a hole formed in the partition.

The inlet may be provided in the plural, and the plurality of inlets may be provided at the same height.

The cooling water reservoir may further include a steam outlet formed in the first storage tank and that forms a path for discharging steam generated in the first storage tank to the outside of the storage tank.

The cooling water reservoir may further include a pressure regulator provided in the second storage tank to maintain an internal pressure of the second storage tank to be equal to an external atmospheric pressure irrespective of an internal pressure of the first storage tank.

The cooling water reservoir may further include filters provided in each of the steam outlet and the pressure regulator to prevent a harmful substance that may be entered into the storage tank from being discharged to the outside through the steam outlet and the pressure regulator.

A nuclear reactor building passive cooling system disposed adjacent to an outer wall of a nuclear reactor building to passively cool the nuclear reactor building includes a storage tank that stores cooling water; a partition part disposed inside the storage tank and that partitions the inside of the storage tank into first and second storage tanks so as to separate the cooling water; and an inlet provided in the partition part and that enables cooling water of the second storage tank to naturally enter into the first storage tank according to a water level difference between the first and second storage tanks when a water level of the first storage tank decreases.

The nuclear reactor building passive cooling system may further include a heat exchanger extended from the first storage tank to the inside of the nuclear reactor building to cool the building based on cooling water of the first storage tank.

A capacity of the first storage tank may be smaller than that of the second storage tank.

The partition part may include a partition disposed between an upper wall and a lower wall of the storage tank.

The inlet may include at least one pipe disposed in the partition or a hole formed in the partition.

The inlet may be provided in the plural, and the plurality of inlets may be provided at the same height.

The nuclear reactor building passive cooling system may further include a steam outlet formed in the first storage tank and that forms a path for discharging steam generated in the first storage tank to the outside of the storage tank.

The nuclear reactor building passive cooling system may further include a pressure regulator provided in the second storage tank to maintain an internal pressure of the second storage tank to be equal to an external atmospheric pressure irrespective of an internal pressure of the first storage tank.

The nuclear reactor building passive cooling system may further include filters provided in each of the steam outlet and the pressure regulator to prevent a radioactive material that may be entered into the storage tank from being discharged to the outside through the pressure outlet and the pressure regulator.

Advantageous Effects

A cooling water reservoir and a nuclear reactor building passive cooling system including the same according to the present invention can quickly stabilize a performance of the nuclear reactor building passive cooling system, thereby preventing performance deterioration of the nuclear reactor building passive cooling system.

Further, a cooling water reservoir and a nuclear reactor building passive cooling system including the same according to the present invention can continuously reduce a pressure and temperature of the nuclear reactor building, thereby suppressing occurrence of a secondary accident such as destruction of the nuclear reactor building.

The technical effects of the present invention are not limited to the effects mentioned above, and other technical effects not mentioned can be clearly understood by those skilled in the art from the following description.

MODE FOR INVENTION

Hereinafter, an embodiment according to the present invention will be described in detail with reference to the attached drawings. However, it should be understood that the present embodiment is not limited to embodiments described hereinafter, but may be implemented in various forms, and the present embodiments enable to complete the disclosure of the present invention and are provided to know completely the scope of the invention to those skilled in the art. In the drawing, shapes of elements may be exaggeratingly expressed for better description, and like reference numerals designate like elements in the drawing.

Figure 1:
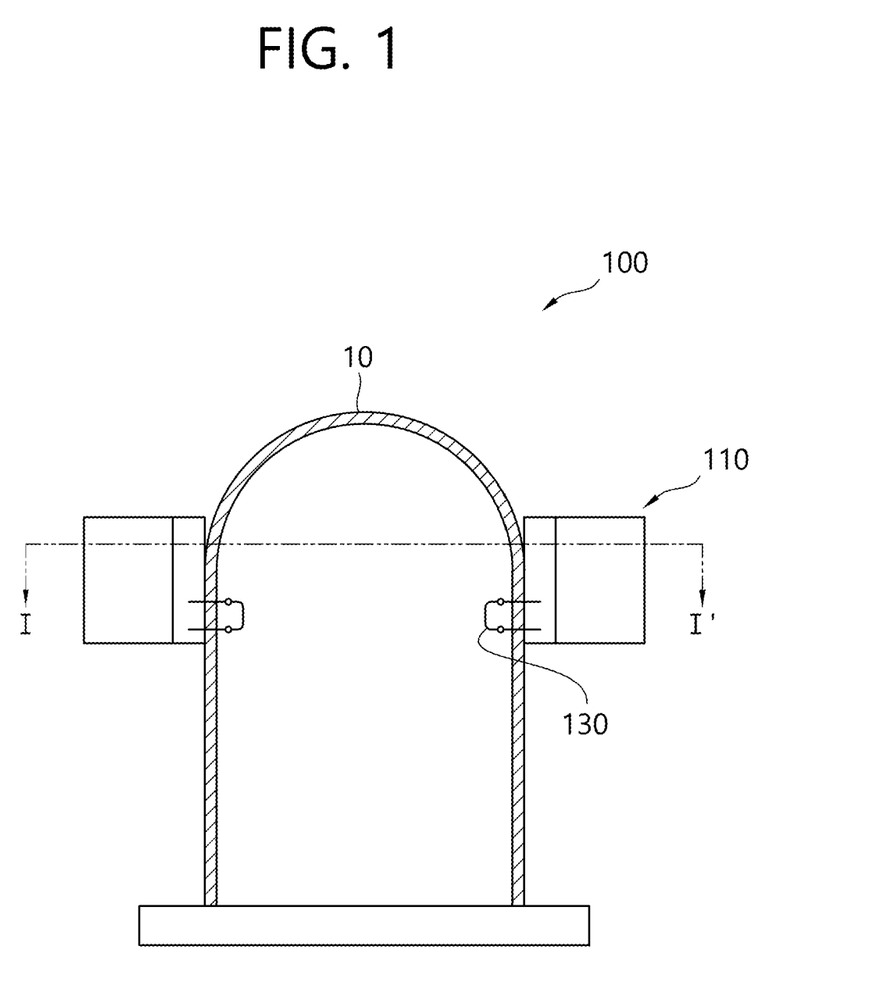
FIG. 1 is a conceptual view schematically illustrating a nuclear reactor building passive cooling system according to the present embodiment.
Figure 2:
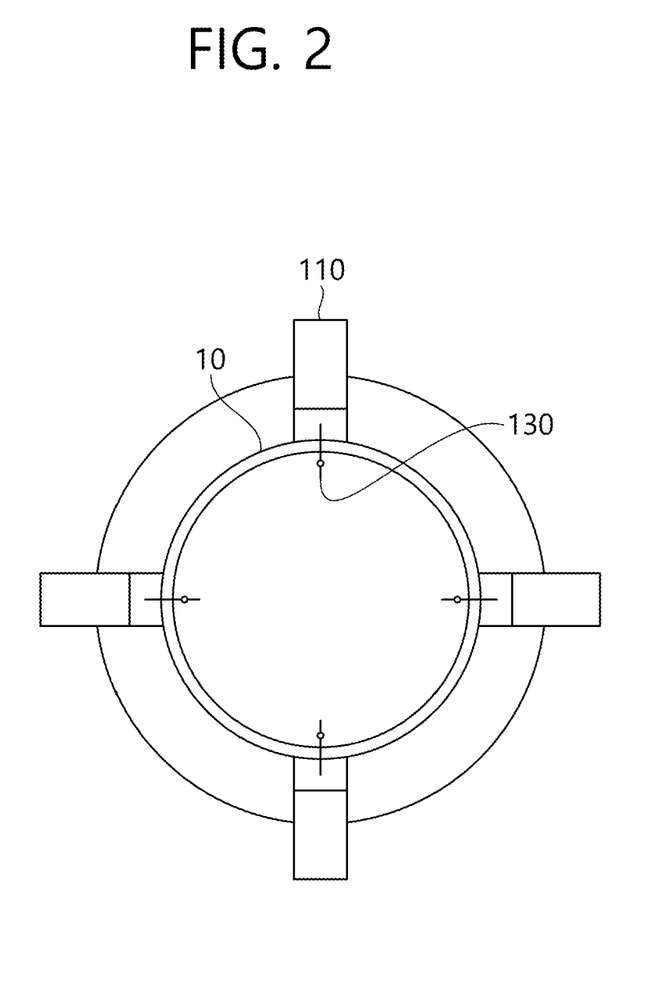
FIG. 2 is a cross-sectional view illustrating a nuclear reactor building passive cooling system according to the present embodiment taken along line I-I' of FIG. 1.

FIG. 1 is a conceptual view schematically illustrating a nuclear reactor building passive cooling system according to the present embodiment, and FIG. 2 is a cross-sectional view illustrating a nuclear reactor building passive cooling system according to the present embodiment taken along line I-I' of FIG. 1.

As shown in FIGS. 1 and 2, a nuclear reactor building passive cooling system 100 (hereinafter, referred to as a cooling system) according to the present embodiment includes a cooling water reservoir 110.

The cooling water reservoir 110 may be disposed in an upper area of an outer circumference of a nuclear reactor building 10. The cooling water reservoir 110 may supply cooling water to the inside of the nuclear reactor building 10, as needed, and in this case, even if main power of a reactor facility is shut off, the cooling water reservoir 110 may be disposed in an upper area of the nuclear reactor building 10 so as to supply cooling water by natural drop. However, when it is unnecessary to supply cooling water to the inside of the nuclear reactor building 10, a height of the cooling water reservoir 110 may be changed.

The cooling water reservoir 110 may be disposed in the plural, FIG. 2 illustrates an embodiment in which four cooling water reservoirs 110 are provided, and the number of the cooling water reservoirs 110 is not limited thereto.

A heat exchanger 130 is connected to the cooling water reservoir 110. One side of the heat exchanger 130 is disposed inside the cooling water reservoir 110 and the other side thereof is extended into the nuclear reactor building 10. For example, an outflow pipe 131 and an inflow pipe 133 of the heat exchanger 130 are extended to the cooling water reservoir 110, and a heat exchange unit 135 is disposed inside the nuclear reactor building 10. Therefore, in the event of a severe accident, the heat exchanger 130 enables the nuclear reactor building 10 to be cooled based on cooling water stored in the cooling water reservoir 110.

The cooling water stored in the cooling water reservoir 110 may be received while being partitioned in the cooling water reservoir 110. Hereinafter, the cooling water reservoir 110 according to the present embodiment will be described in detail with reference to the accompanying drawings. However, a detailed description of the above-described constituent elements is omitted and constituent elements identical to or corresponding to those according to the foregoing embodiment are denoted by the same reference numerals.

Figure 3:
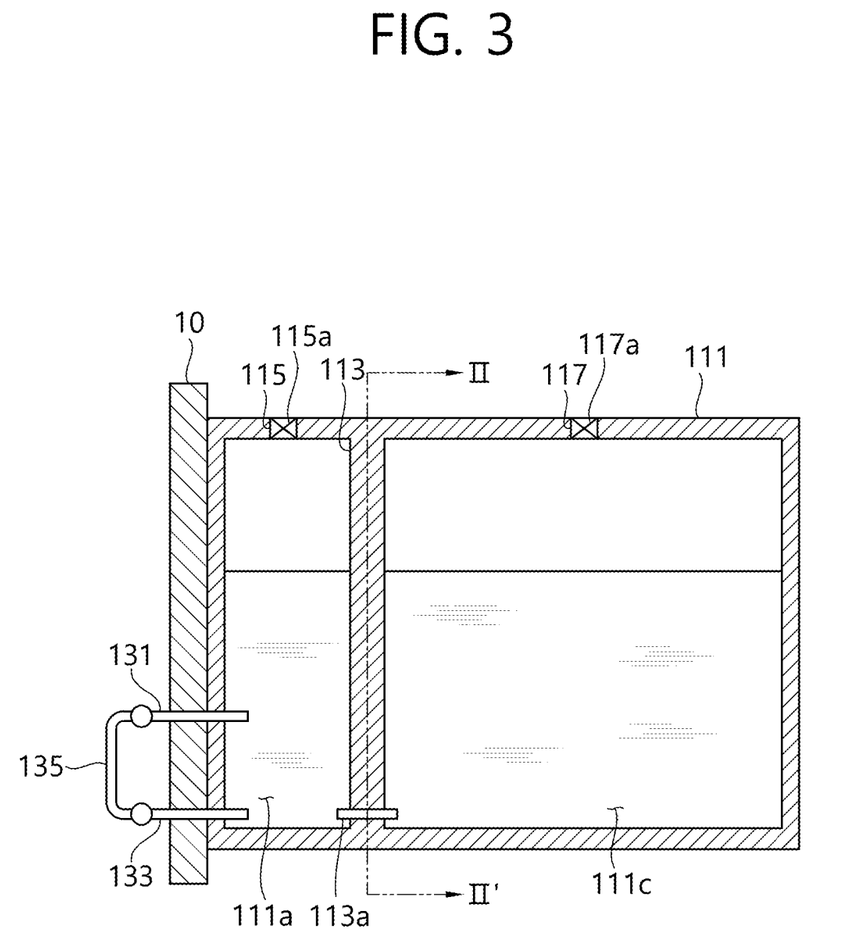
FIG. 3 is a cross-sectional view schematically illustrating a cooling water reservoir of a nuclear reactor building passive cooling system according to the present embodiment.
Figure 4:
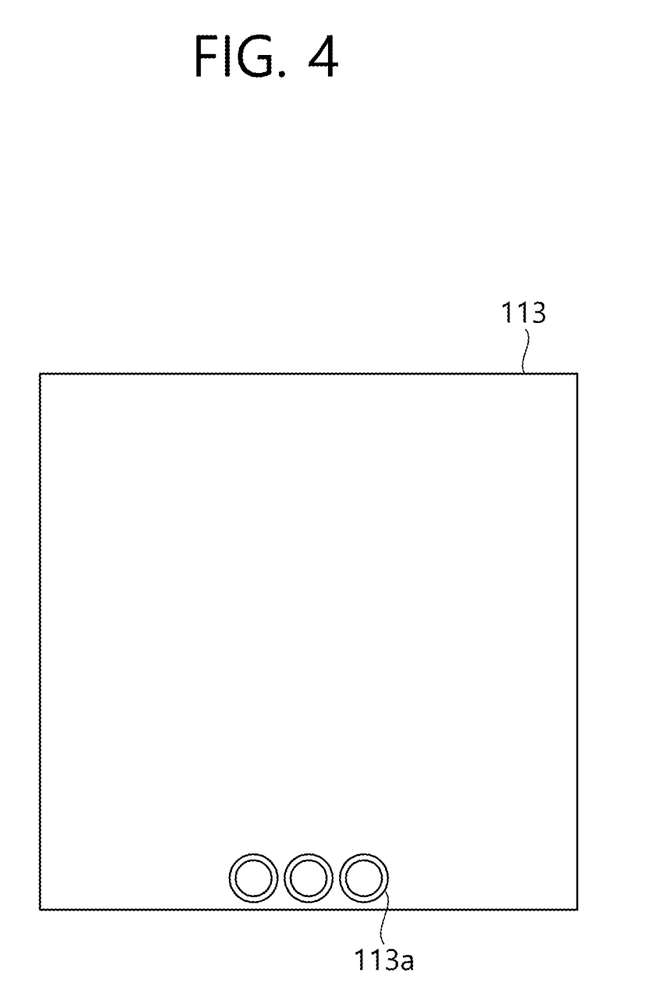
FIG. 4 is a cross-sectional view illustrating a cooling water reservoir of a nuclear reactor building passive cooling system according to the present embodiment taken along line II-II' of FIG. 1.

FIG. 3 is a cross-sectional view schematically illustrating a cooling water reservoir of a nuclear reactor building passive cooling system according to the present embodiment, and FIG. 4 is a cross-sectional view illustrating a cooling water reservoir of a nuclear reactor building passive cooling system according to the present embodiment taken along line II-II' of FIG. 1.

As shown in FIGS. 3 and 4, the cooling water reservoir 110 according to the present embodiment includes a storage tank 111. The storage tank 111 may form an outer shape of the cooling water reservoir 110 and may be supported to an outer wall of the nuclear reactor building 10. Here, the storage tank 111 forms a space for receiving cooling water therein and may be provided in a substantially cubic shape, but a shape of the storage tank 111 is not limited thereto.

At the inside of the storage tank 111, a partition part for partitioning a receiving space of the cooling water is provided. The partition part may be provided as a partition 113. The partition 113 disposed between an upper wall and a lower wall of the storage tank 111 forms a first storage tank 111a adjacent to the nuclear reactor building 10 and a second storage tank 111c separated from the first storage tank 111a. Here, the heat exchanger 130 is connected to the first storage tank 111a. A capacity of the second storage tank 111c may be set to be larger than that of the first storage tank 111a. For example, a capacity of the first storage tank 111a may be 50% or less of that of the entire storage tank 111.

A steam outlet 115 is formed in an upper wall of the first storage tank 111a. The steam outlet 115 enables steam generating by heating cooling water of the first storage tank 111a when cooling the nuclear reactor building 10 to be discharged to the outside. Therefore, the storage tank 111 can be prevented from being broken or damaged due to a change in an internal pressure.

A pressure regulator 117 is formed in an upper wall of the second storage tank 111c. The pressure regulator 117 maintains an internal pressure of the second storage tank 111c to be equal to an external atmospheric pressure irrespective of an internal pressure of the first storage tank 111a.

Filters 115a and 117a are mounted in the steam outlet 115 and the pressure regulator 117, respectively. When the heat exchanger 130 is broken or damaged, the filters 115a and 117a prevent harmful substances, for example, radioactive materials that may be entered from the inside of the nuclear reactor building 10 into the storage tank 111 from being discharged to outer air.

In a lower area of the partition 113, an inlet for enabling the first storage tank 111a and the second storage tank 111c to communicate may be provided. Such an inlet may be provided as a connection pipe 113a. Here, a plurality of connecting pipes 113a may be provided. However, when a plurality of connecting pipes 113a are provided, the plurality of connecting pipes 113a may be disposed at the same height in order to prevent cooling water from circulating by natural convection between the first storage tank 111a and the second storage tank 111c.

Further, FIG. 4 illustrates an embodiment in which three connecting pipes 113a are provided, but the number of the connecting pipes 113a is not limited thereto. In the present embodiment, the connection pipe 113a is disposed in the partition 113 and thus the first storage tank 111a and the second storage tank 111c communicate with each other. However, in the partition 113, a hole may be formed, except for the connection pipe 113a, and the hole may be formed in various shapes including a circular shape and a slit.

The connection pipe 113a forms a path that may enable cooling water received in the second storage tank to enter into the first storage tank 111a.

More specifically, in the event of a severe accident, the first storage tank 111a connected to the heat exchanger 130 quickly reaches a saturation temperature. This contributes to stabilization of a heat removal performance of the cooling system 100 and thus a temperature and pressure of the nuclear reactor building 10 are quickly stabilized. The reason why a capacity of the first storage tank 111a is smaller than that of the second storage tank 111c as described above is intended to achieve such an effect.

Thereafter, the first storage tank 111a reaches a saturation temperature, and cooling water received in the first storage tank 111a is heated and discharged to the outside through the steam outlet 115. Therefore, a water level difference occurs between the first storage tank 111a and the second storage tank 111c. Therefore, cooling water in the second storage tank 111c is entered into the first storage tank 111a through the connection pipe 113a so as to eliminate the water level difference.

Accordingly, the cooling water reservoir 110 constantly maintains a heat removal performance of the cooling system 100 from the beginning of a severe accident to enable a pressure and temperature of the nuclear reactor building 10 to gradually reduce. Therefore, in a conventional cooling system, while a temperature and pressure of the nuclear reactor building 10 decrease, a heat removal performance decreases due to increase of the cooling water temperature and a problem can be solved that the pressure and temperature of the nuclear reactor building 10 is thus re-pressurized and reheated.

More specifically, the conventional cooling system and the cooling system 100 according to the present embodiment are compared as follows.

Figure 5:
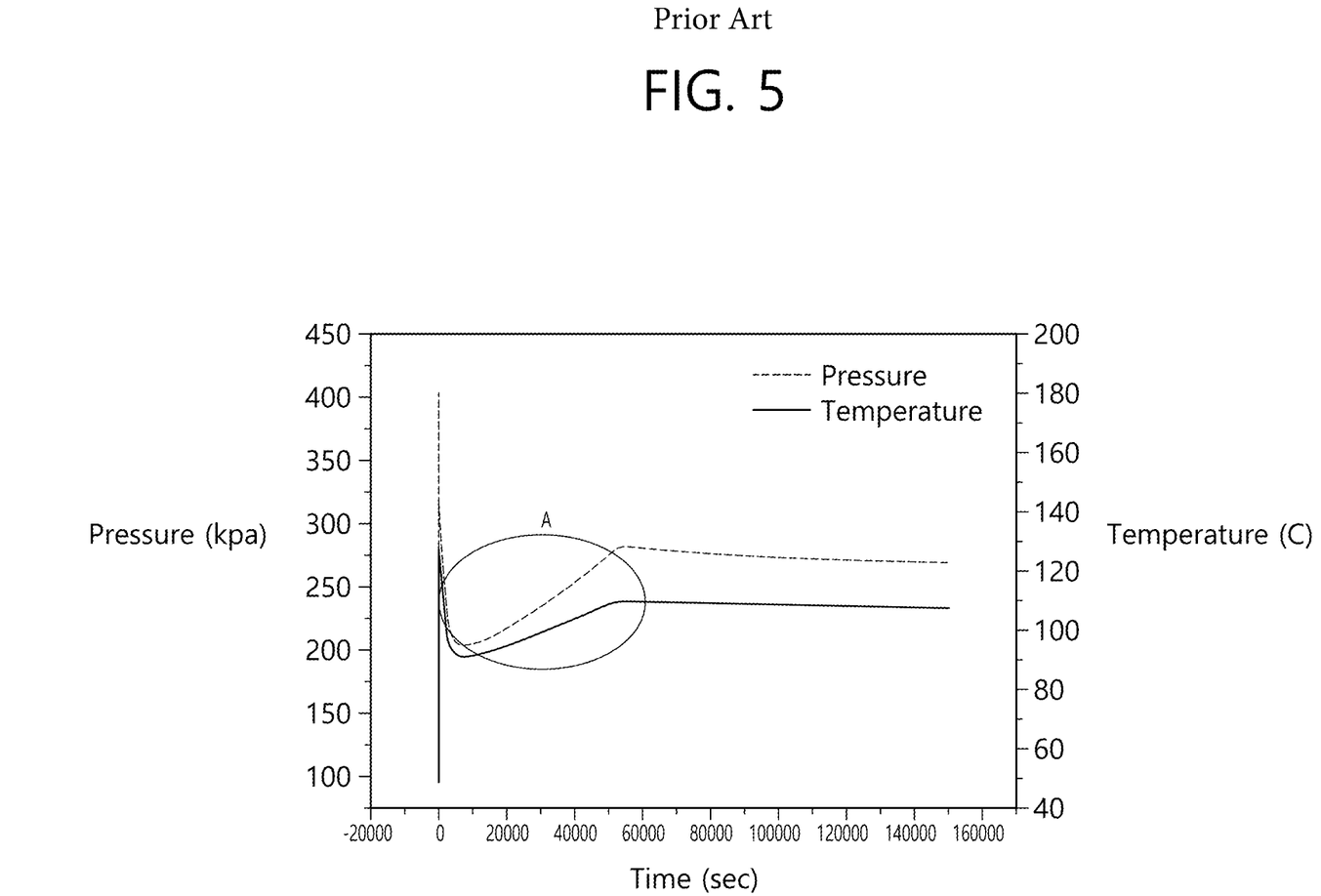
FIG. 5 is a graph illustrating changes in an internal pressure and temperature of a nuclear reactor building according to use of a cooling water reservoir of a conventional passive cooling system.
Figure 6:
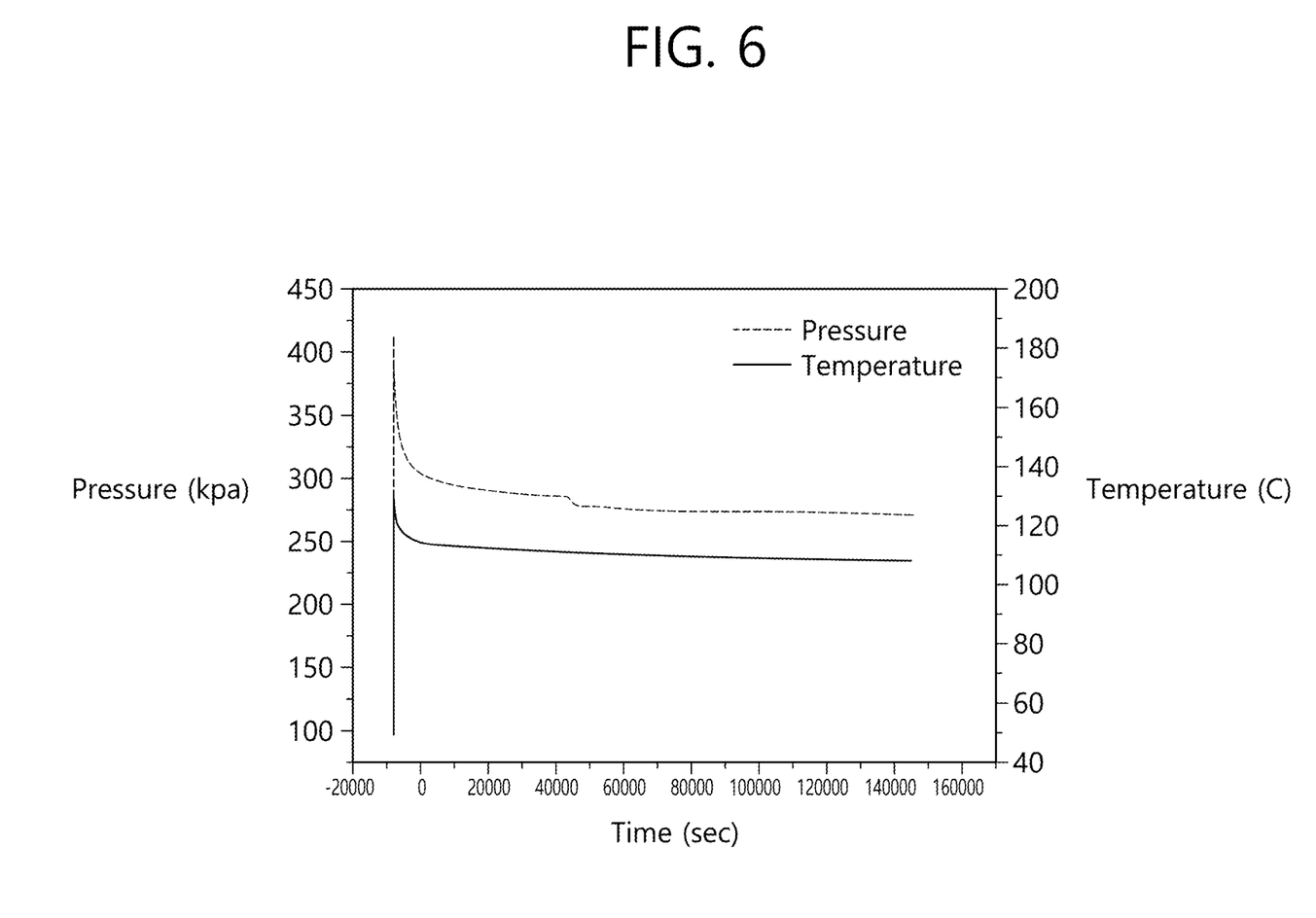
FIG. 6 is a graph illustrating changes in an internal pressure and temperature of a nuclear reactor building according to use of a cooling water reservoir of a nuclear reactor building passive cooling system according to the present embodiment.

FIG. 5 is a graph illustrating changes in an internal pressure and temperature of a nuclear reactor building according to use of a cooling water reservoir of a conventional passive cooling system. FIG. 6 is a graph illustrating changes in an internal pressure and temperature of a nuclear reactor building according to use of a cooling water reservoir of a nuclear reactor building passive cooling system according to the present embodiment.

As shown in FIGS. 5 and 6, a conventional cooling system operates with temperature and pressure rise of the nuclear reactor building 10 in the event of a severe accident. In this case, the conventional cooling system may reduce a temperature and pressure of the nuclear reactor building 10.

However, in the conventional cooling system, after a predetermined time has lapsed, as cooling water is heated, efficiency of the cooling system is drastically lowered. As shown in a section "A" of FIG. 5, there is a problem that a temperature and pressure of the nuclear reactor building 10 increase again. Particularly, in such a process, the nuclear reactor building 10 may be broken or damaged due to stress applied to the nuclear reactor building 10.

However, in the cooling system 100 according to the present embodiment, even if cooling water stored in the first storage tank 111a is heated, cooling water received in the second storage tank 111c is naturally entered into the first storage tank 111a according to steam discharged to outside air. Accordingly, as shown in FIG. 6, a temperature and pressure of the nuclear reactor building 10 are reduced smoothly in the event of a severe accident, and a problem can be solved that the temperature and pressure of the nuclear reactor building 10 rise again. Therefore, stress applied to the nuclear reactor building 10 can be suppressed from occurring.

Hereinafter, an operation of a nuclear reactor building passive cooling system according to the present embodiment will be described in more detail. However, a detailed description of the above-described constituent elements is omitted and constituent elements identical to or corresponding to those according to the foregoing embodiment are denoted by the same reference numerals.

Figure 7:
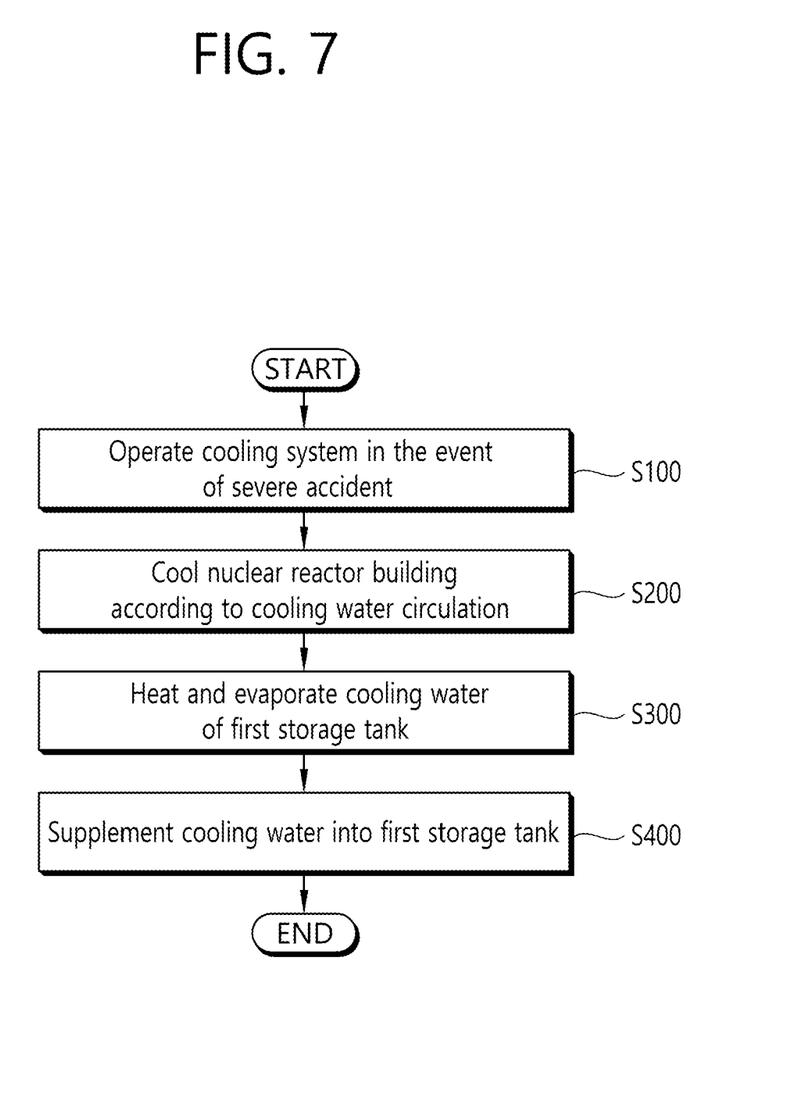
FIG. 7 is a flowchart illustrating an operation of a nuclear reactor building passive cooling system according to the present embodiment.

FIG. 7 is a flowchart illustrating an operation of a nuclear reactor building passive cooling system according to the present embodiment.

As shown in FIG. 7, the cooling system 100 according to the present embodiment may be operated in the event of a severe accident (S100). In this case, steam and radioactive materials are discharged from inside the nuclear reactor building 10, thereby increasing a temperature and pressure of an inner space of the nuclear reactor building 10.

Therefore, cooling water in the heat exchange unit 135 is heated, and the heated cooling water is entered into the first storage tank 111a. In this case, the cooling water received in the first storage tank 111a is entered into the heat exchanger 130 to be provided to the heat exchange unit 135. In this manner, the cooling system 100 repeats inflow and outflow and circulates cooling water based on a natural force (S200).

After a severe accident occurs, as a time has elapsed, a temperature of cooling water in the first storage tank 111a rises to a boiling point (S300). However, in a state in which cooling water stored in the second storage tank 111c is not mixed with the cooling water in the first storage tank 111a, the cooling water stored in the second storage tank 111c maintains an initial temperature.

Further, a time at which cooling water in the first storage tank 111a reaches a boiling point becomes shorter than that of a conventional cooling water reservoir having the same capacity as that of the cooling water reservoir 110 according to the present embodiment. Therefore, the cooling system 100 according to the present embodiment is stabilized through a relatively short transient period.

Further, as cooling water of the first storage tank 111a evaporates, cooling water of a low temperature of the second storage tank 111c is naturally entered into the first storage tank 111a (S400). Accordingly, a heat removal performance of the cooling system 100 is lowered due to increase in a temperature of cooling water stored in the first storage tank 111a, thereby solving a problem that a pressure and temperature of the nuclear reactor building 10 are re-pressurized and reheated.

Therefore, a cooling water reservoir and a nuclear reactor passive cooling system including the same can quickly stabilize a performance of the nuclear reactor passive cooling system, thereby preventing performance deterioration of the nuclear reactor passive cooling system.

Further, the cooling water reservoir and the nuclear reactor passive cooling system including the same can continuously reduce a pressure and temperature of the nuclear reactor building, and thus a secondary accident such as destruction of the nuclear reactor building can be suppressed from occurring.

The embodiments of the present invention described above and shown in the drawings should not be construed as limiting the technical idea of the present invention. The scope of the present invention is limited only by the matters described in the claims, and those skilled in the art can modify the technical idea of the present invention in various forms. Accordingly, such improvements and modifications will fall within the scope of the present invention as long as they are obvious to those skilled in the art.

The invention claimed is:

1. A cooling water reservoir that can passively cool a building, the cooling water reservoir comprising:
    a storage tank that stores cooling water;
    a partition part disposed inside the storage tank and that partitions the inside of the storage tank into first and second storage tanks so as to separate the cooling water;
    a heat exchanger extended from the first storage tank to a nuclear reactor building and that cools the building based on the cooling water of the first storage tank; and
    at least one inlet provided in the partition part and that enables cooling water of the second storage tank to naturally enter into the first storage tank according to a water level difference between the first and second storage tanks when a water level of the first storage tank decreases, wherein a water capacity of the first storage tank is smaller than that of the second storage tank.

2. The cooling water reservoir of claim 1, wherein the partition part comprises a partition disposed between an upper wall and a lower wall of the storage tank.

3. The cooling water reservoir of claim 2, wherein the at least one inlet comprises at least one pipe disposed in the partition or a hole formed in the partition.

4. The cooling water reservoir of claim 2, wherein the at least one inlet comprises a plurality of inlets that are provided at the same height.

5. The cooling water reservoir of claim 1, further comprising a steam outlet formed in the first storage tank and that forms a path for discharging steam generated in the first storage tank to the outside of the storage tank.

6. The cooling water reservoir of claim 5, further comprising a pressure regulator provided in the second storage tank to maintain an internal pressure of the second storage tank to be equal to an external atmospheric pressure irrespective of an internal pressure of the first storage tank.

7. The cooling water reservoir of claim 6, further comprising filters provided in each of the steam outlet and the pressure regulator to prevent a harmful substance that may be entered into the storage tank from being discharged to the outside through the steam outlet and the pressure regulator.

8. A nuclear reactor building passive cooling system disposed adjacent to an outer wall of a nuclear reactor building to passively cool the nuclear reactor building, the nuclear reactor building passive cooling system comprising:
    a storage tank that stores cooling water;
    a partition part disposed inside the storage tank and that partitions the inside of the storage tank into first and second storage tanks so as to separate the cooling water;
    a heat exchanger extended from the first storage tank to the inside of the nuclear reactor building to cool the nuclear reactor building based on cooling water of the first storage tank; and
    at least one inlet provided in the partition part and that enables cooling water of the second storage tank to naturally enter into the first storage tank according to a water level difference between the first and second storage tanks when a water level of the first storage tank decreases, wherein a water capacity of the first storage tank is smaller than that of the second storage tank.

9. The nuclear reactor passive cooling system of claim 8, wherein the partition part comprises a partition disposed between an upper wall and a lower wall of the storage tank.

10. The nuclear reactor passive cooling system of claim 9, wherein the at least one inlet comprises at least one pipe disposed in the partition or a hole formed in the partition.

11. The nuclear reactor passive cooling system of claim 9, wherein the at least one inlet comprises a plurality of inlets that are provided at the same height.

12. The nuclear reactor passive cooling system of claim 8, further comprising a steam outlet formed in the first storage tank and that forms a path for discharging steam generated in the first storage tank to the outside of the storage tank.

13. The nuclear reactor passive cooling system of claim 12, further comprising a pressure regulator provided in the second storage tank to maintain an internal pressure of the second storage tank to be equal to an external atmospheric pressure irrespective of an internal pressure of the first storage tank.

14. The nuclear reactor passive cooling system of claim 13, further comprising filters provided in each of the steam outlet and the pressure regulator to prevent a radioactive material that may be entered into the storage tank from being discharged to the outside through the pressure outlet and the pressure regulator.

\* \* \* \* \*